A. M. CLARK.
RAILWAY TRUCK.
APPLICATION FILED JAN. 27, 1908.
922,750.
Patented May 25, 1909.
6 SHEETS—SHEET 6.
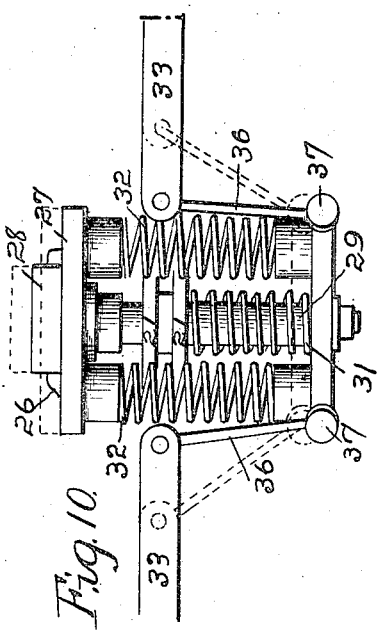
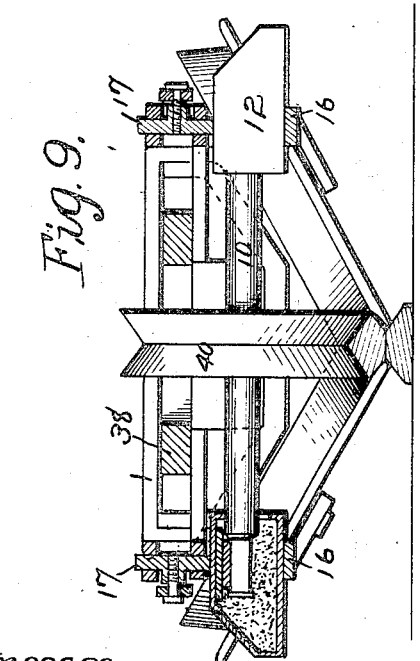
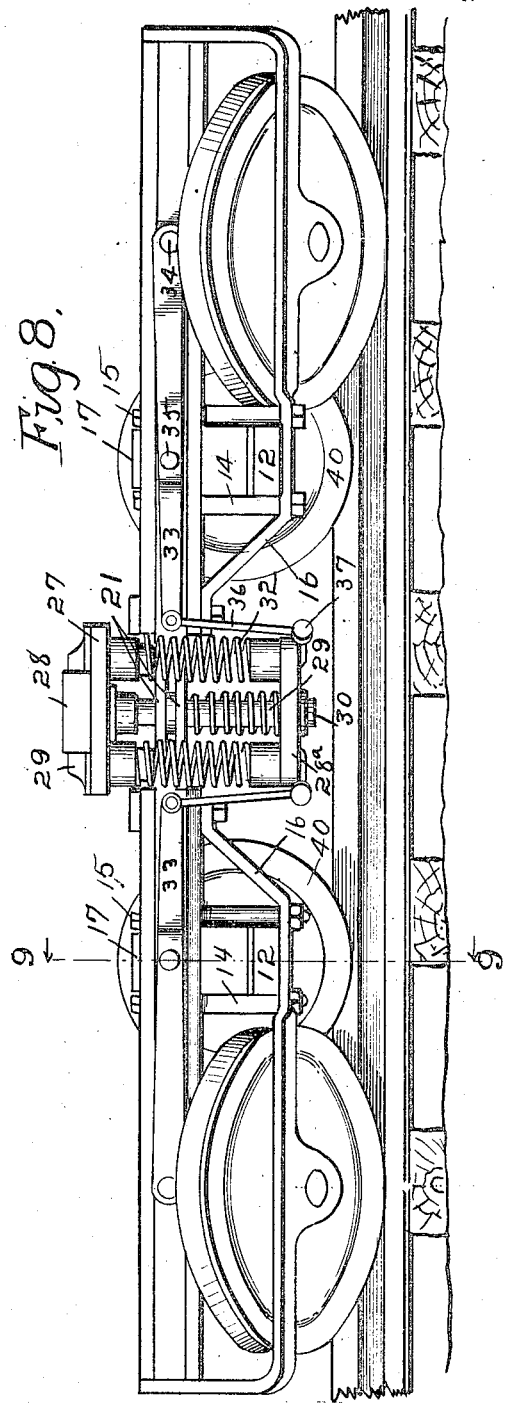
Witnesses
A. G. Hague.
F. C. Dahlberg.
Inventor
A. M. Clark
by Drury & Lane Attys

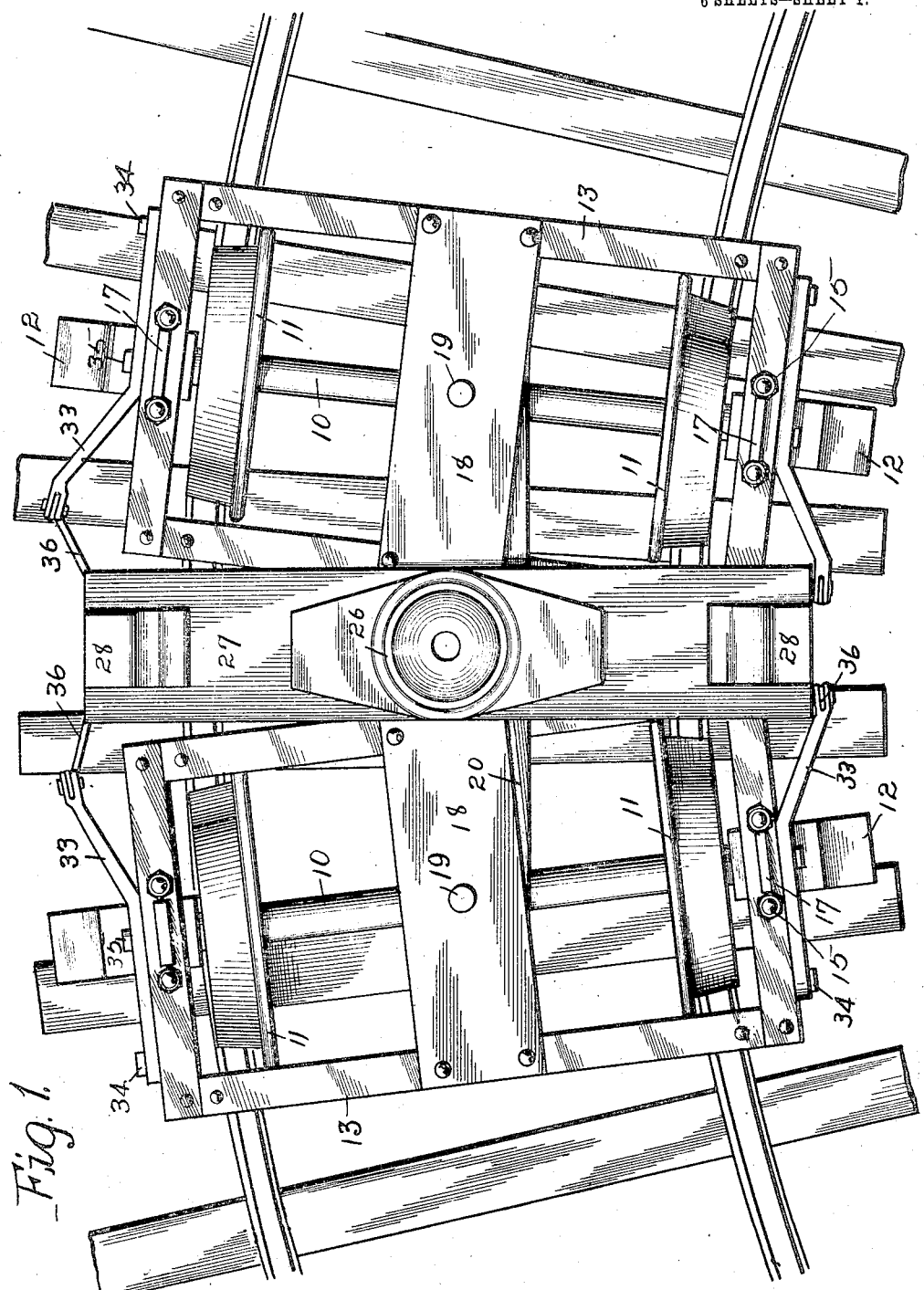

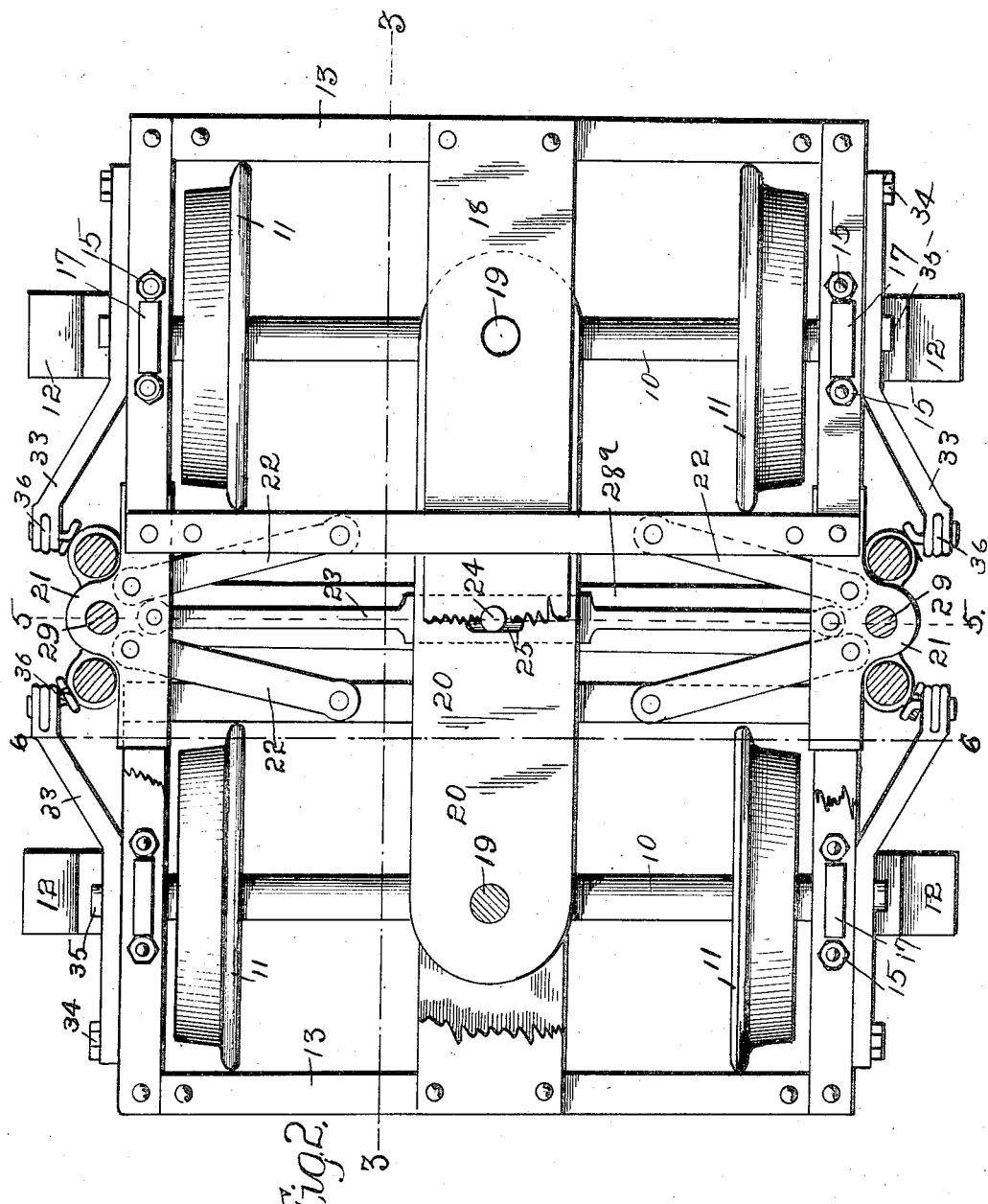

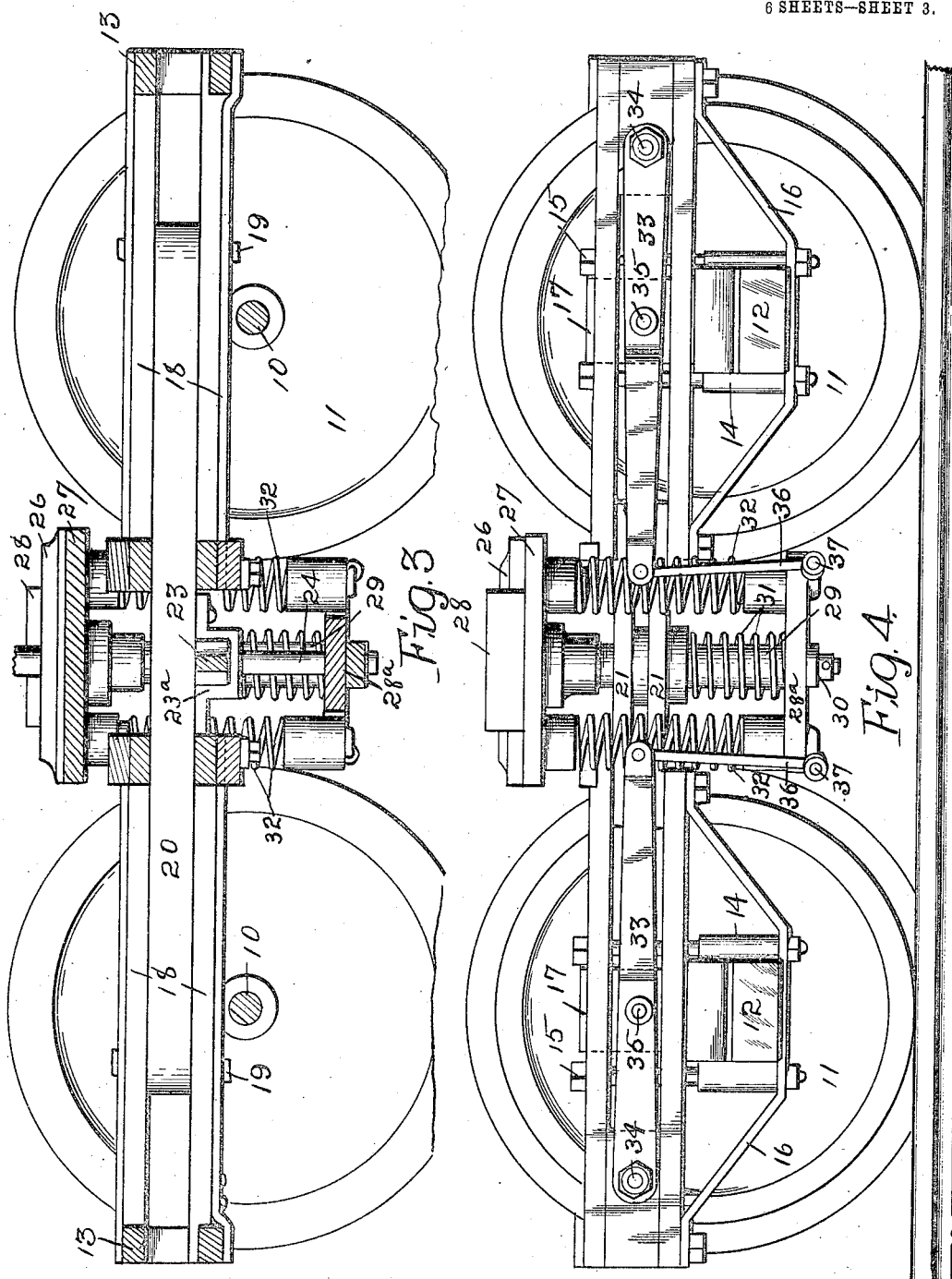

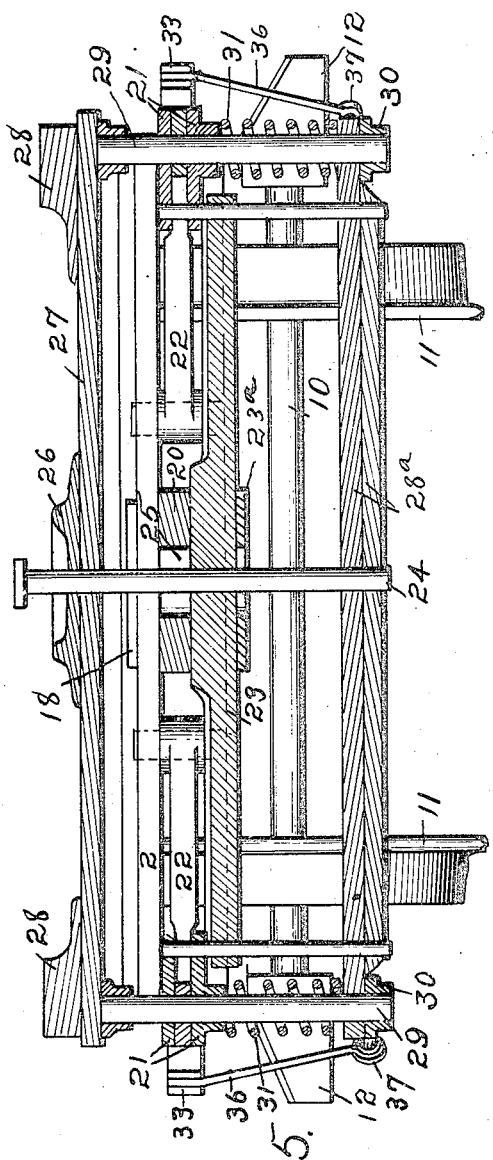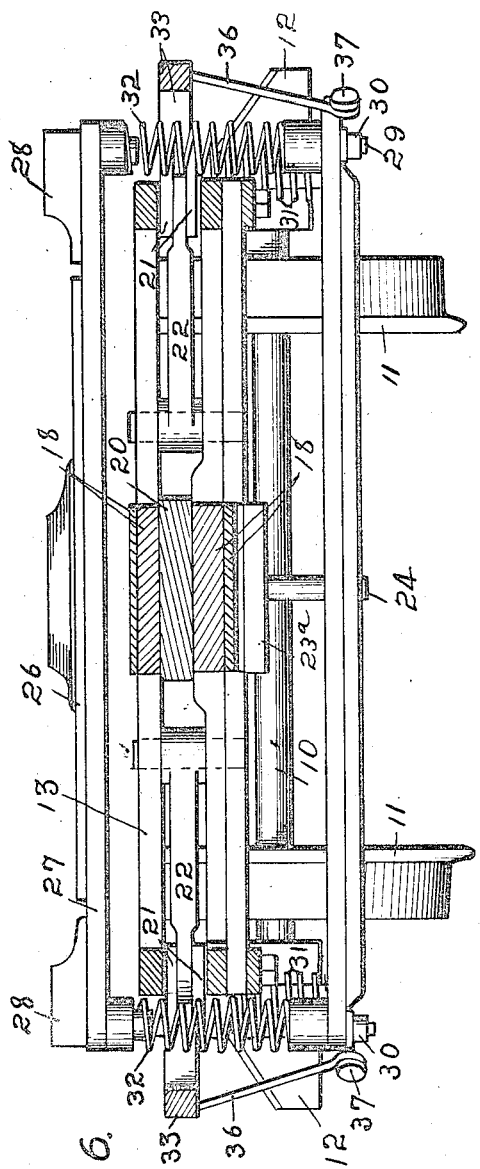

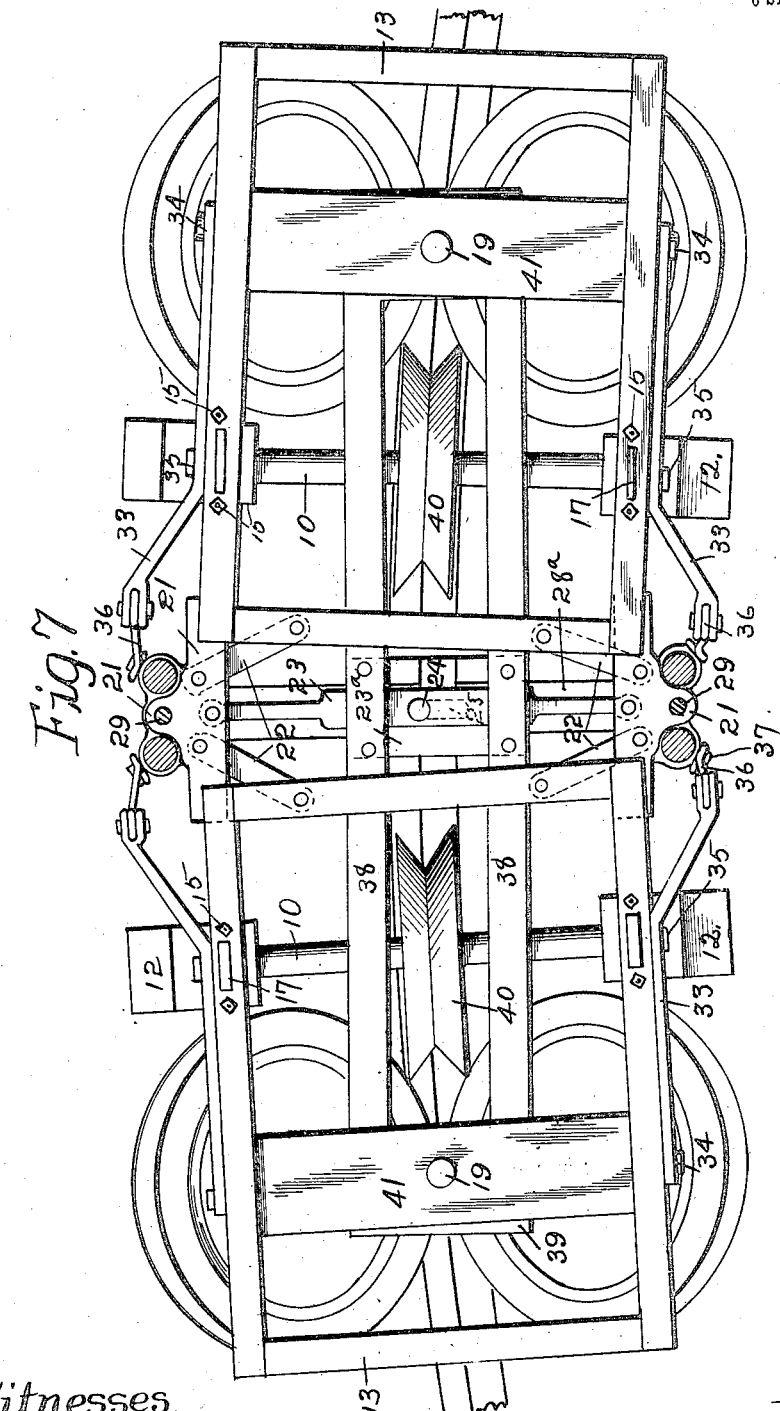

UNITED STATES PATENT OFFICE.

ALBERT M. CLARK, OF MARSHALLTOWN, IOWA.

RAILWAY-TRUCK.

No. 922,750.   Specification of Letters Patent.   Patented May 25, 1909.

Application filed January 27, 1908. Serial No. 412,770.

*To all whom it may concern:*

Be it known that I, ALBERT M. CLARK, a citizen of the United States, residing at Marshalltown, in the county of Marshall and State of Iowa, have invented a new and useful Railway-Truck, of which the following is a specification.

The object of my invention is to provide a railway truck of simple and durable construction, so arranged that the entire weight of the end of a car may be borne upon the turn table of a single bolster, and the weight be distributed from the bolster equally upon all of the truck wheels, and to provide a truck of this kind in which the axles of the forward and rear pairs of wheels may assume positions out of parallelism with each other, so that when the truck is going around a curved portion of the track, the flanges of the wheels will not bind against the track, as is the case in trucks in which the forward and rear wheels of a truck are held parallel at all times.

A further object is to provide a device of this kind in which the weight of a car is cushioned as applied to the supporting wheels, and further to provide means whereby the end of the bolster adjacent to the outer rail of a curve in a track will be automatically elevated a slight distance above the other end of the bolster, to thereby slightly tilt or incline the car in a direction away from the outer rail of a curved track.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a top or plan view of a truck embodying my invention and supported on a curved track. Fig. 2 shows a top or plan view of a truck embodying my invention with the bolster and adjacent parts removed to show certain details of construction that are concealed in Fig. 1. Fig. 3 shows a sectional view on the line 3—3 of Fig. 2. Fig. 4 shows a side elevation of a truck embodying my invention. Fig. 5 shows a sectional view on the line 5—5 of Fig. 2. Fig. 6 shows a sectional view on the line 6—6 of Fig. 2. Fig. 7 shows a top or plan view of a modified form of the invention designed for use upon a single rail. Fig. 8 shows a side elevation of same. Fig. 9 shows a sectional view on the line 9—9 of Fig. 8, said view being taken through the center of one of the bearing boxes, and at the side of the other, and—Fig. 10 shows an enlarged detail view of the bolster supporting springs, and connected parts. The dotted lines in said figure indicate the positions the parts would assume when the truck is going around a curved portion of a track, and the outer end of the bolster is elevated.

Referring to the accompanying drawings, I have used the reference numeral 10 to indicate the axles, and 11 the flanged wheels secured thereto. Each axle is mounted in the bearing boxes 12. I provide an independent frame for each axle, each of which is indicated by the numeral 13, and is composed of side and end members rigidly connected. Each bearing box is mounted in its frame by means of two sleeves 14 fixed to its sides and slidingly mounted upon the upright bolts 15. The lower ends of said bolts are supported by the straps 16 secured below the frame sides. By this arrangement, the bearing boxes are permitted to move vertically a limited distance relative to the frame. A sliding block 17 is mounted in each side of the frame, and rests upon the top of each bearing box. These blocks 17 support the weight of the central bolster in a manner to be hereinafter described. I connect the two frames together to form a truck as follows: Arranged longitudinally at the center of each frame is a plate 18, and fixed to said plate above the center of the axle is a pin 19. These two pins are connected by means of a connecting bar 20, which is pivoted at its ends to both pins 19, and in this way the two frames are held in position relative to each other against movement toward or from each other.

In order to provide for an equal movement of the frames relative to each other when one is turned with its axle out of parallelism with the other, I have provided two plates 21 arranged at the sides of the trucks, and pivoted to each plate 21 are two equalizing levers 22 extended from the plates inwardly toward the center of the truck, and on divergent lines with their inner ends, pivoted to the adjacent portions of the truck frames, as clearly shown in Fig. 2.

In order to hold the plates 21 in proper position relative to each other, I provide a cross bar 23 having the center pin 24 passed through its central portion. Said bar projects through a sleeve 23ª on the connecting bar 20. By this arrangement, it is obvious that both the plates 21 will be held by the bar 23 at points equally distant from the longitudinal center of the truck, and when one truck frame is inclined to position out of parallelism with the other, the levers 22 and plates 21 will serve to turn the opposite truck at the same degree of inclination from the bar 23 as the first truck is turned, but in an opposite direction, so that all of the wheels will stand in proper position for resting upon a curved track. In this connection, it is to be understood that the connecting bar 20 is provided with a transverse slot 25, through which the center pin 24 is passed, thus permitting the central portion of the connecting bar 20 to move laterally with relation to the pivot pin 24, as required when the truck is rounding a curve. The weight to be borne by the truck is carried upon a center plate 26 mounted on the upper bolster member 27.

At the ends of the bolster are the chairs 28 designed to aid in supporting the weight of a car. The center pin 24 is extended through the center of the center plate 26 and through the bolster member 27. It is also extended through the lower bolster member 28ª. The upper and lower bolster members are connected by means of pins 29. These pins are fixed at their upper ends to the bolster members 27, and extend downwardly through the plates 21 and through the lower bolster member 28ª, and are provided at their lower ends with nuts 30. Said pins are slidingly connected with the lower bolster member.

Mounted upon each of the pins 29 is an extensible coil spring 31 with its lower end resting upon the lower bolster member 28ª, and its upper end engaging and supporting the plate 21 against downward movement. Interposed between the upper and lower bolster members on each side are the cushioning springs 32, hence any weight applied to the upper bolster member is transmitted through the springs 32 to the lower bolster member.

I have provided for distributing any weight applied to the lower bolster member equally upon each of the four bearing boxes as follows: Pivoted to the outer end of each side of each truck frame is a lever 33 pivoted at 34, and extended inwardly toward the center of the truck. Each lever is provided with a pin 35, which pin is connected to the sliding block 17 and as before stated, this block rests on top of the bearing boxes. At the inner end of each lever 33 is a hanger 36, which hanger extends downwardly and is pivoted at its lower end to a lug 37 on the lower bolster member, hence, all of the weight applied to the lower bolster member is transmitted to the four sliding blocks 17 which rest directly upon the four bearing boxes.

One of the important features of my invention consists in the provision of means for automatically elevating the end of the bolster that is adjacent to the outer portion of the curve in a track, and the means by which this is accomplished is clearly shown in Fig. 10. When both truck frames are in parallel positions the hangers 36 extend approximately vertical. However, when the truck frames assume the relative positions shown in Fig. 1, then the levers 33 at the outer side of the curved track will separate a greater distance than the corresponding levers on the inner side of the track will move toward each other, hence, the outer end of the bolster will be slightly elevated as shown in Fig. 10, and this elevation will be greater than that of the inner end.

In practical operation, and assuming that the truck is standing upon a straight track, it is obvious that the weight of a car resting upon the upper bolster member will tend to yieldingly hold the wheels on the front and rear frame members in line with each other, for the reason that said weight tends to depress the bolster and thus forces the lower bolster member down to its lower limit, thereby applying equal power upon each of the four hangers 36, therefore, the inner ends of the levers 33 will be yieldingly held in such positions that the wheels of the front and rear frames will aline by means of the weight of the car applied to the truck. Therefore, when the truck is standing upon or running on a straight track, the wheels will rest upon the rails in the same manner as would the wheels of a rigid truck, and hence, there will be no friction occasioned by the wheel flanges rubbing against the inner faces of the rails. Assuming that the truck starts to go over a curved track, then when the front wheels strike the curved portion, the wheel flanges will at once cause the forward axle to assume a position at an angle divergent from the bolster, and this movement will be transmitted through the equalizing levers 22 and the plates 21 to the truck frame of the rear wheels and cause it to stand at an equal angle relative to the bolster in an opposite direction, so that the wheel flanges of the forward and rear truck frames will have no tendency to bind upon the rails, on a curved portion of a track, such as is the case with a rigid truck having four or more flanged wheels. The springs 31 serve to cushion the vibrations of the truck frames, as applied to the supporting bolster, and hence the vibrations as applied to the bolster will be reduced to a minimum.

In Figs. 7, 8 and 9, I have illustrated a modified form of truck of the class designed to be used upon a single rail, and I have shown this modified form for the purpose of illustrating the means by which my invention as illustrated in the other figures may be applied to a truck of this kind. The various features of this truck, by which it is enabled to run upon a single rail, form no part of my present invention, and they are fully illustrated and described in Patent No. 825,958, issued July 17, 1906. It is believed that the structure and function of my invention as applied to a truck of this kind will be made clear if it is assumed that the various parts shown in Figs. 7, 8 and 9 and indicated by reference numerals, are considered to be the equivalents of the parts bearing the same numerals in the other form of my invention. Practically the only structural change necessary to adapt my present invention to the form of truck shown in Figs. 7, 8 and 9, is in the connecting plate which in the forms shown in Fig. 7 is seen to be composed of two parallel side members 38 and ends 39, the side members being spaced apart from each other so as to permit the grooved wheels 40 to project upwardly between said side members 38. However, the parts 38 and 39 are the mechanical equivalent of the connecting plate 20, and the cross pieces 41 shown in Fig. 7 are the mechanical equivalents of the parts 18 shown in Fig. 2. The operation of this modified form in so far as the arrangement of the wheels for use on a single rail is concerned, is fully illustrated and described in the patent above referred to, and the function of the parts by which the front and rear truck members are able to turn to conform to a curved track, are fully illustrated and described in the description relating to the preferred form of my invention.

Having thus described my invention, what I claim and desire to secure by Letters Patent, is—

1. A truck, comprising two axles, a frame for each axle, a bolster arranged between the axles, levers fulcrumed to the frames connected with said axles and also connected with the bolster, an equalizing device connected to the bolster and to said frames for holding the frames either in parallel positions or at equal divergent angles relative to the transverse center of the truck.

2. A truck, comprising two axles, a frame for each axle, a bolster arranged between the axles, levers fulcrumed to the frames connected with said axles and also connected with the bolster, an equalizing device connected to the bolster and to said frames for holding the frames either in parallel positions or at equal divergent angles relative to the transverse center of the truck, and a connecting piece pivoted centrally to each frame.

3. A truck, comprising two axles, a frame for each axle, a bolster, and equalizing levers pivoted to the frames and to the bolster, and arranged in substantially horizontal positions on lines diverging slightly from the transverse center of the truck.

4. A truck comprising two axles, a frame for each axle, a connecting piece pivoted centrally to both frames, a bolster comprising an upper bolster member and a lower bolster member, springs interposed between the bolster members, and equalizing levers pivoted to the frames and to the bolster.

5. A truck comprising two axles, a frame for each axle, a connecting piece pivoted centrally to both frames, an upper and a lower bolster member, springs interposed between them, a center pivot pin passed through both bolster members and through the connecting pieces, the latter being slotted to receive the center pin, and equalizing levers pivoted to the frames and extended outwardly and toward each other, and pivoted to the bolster.

6. A truck comprising two axles, a frame for each, a connecting piece centrally pivoted to both frames, an upper and a lower bolster member, a pin fixed to each end of the upper bolster member, and slidingly connected with the lower bolster member, springs interposed between the upper and lower bolster members, plates slidingly mounted on said pin, a cross piece connecting said plates with each other, a spring interposed between the lower bolster member and each of said plates, and means for transmitting the weight applied to the lower bolster member to the frames.

7. A truck, comprising two axles, a frame for each axle, means for connecting the frames to permit them to move to divergent angles relative to each other, a bolster, and levers pivoted to the frames resting upon said axles, and connected to the bolster for distributing weight equally upon the frames when at any position of their movement relative to each other.

8. A truck, comprising two axles, a frame for each axle, a bolster, and equalizing levers pivoted to the frames and to the bolster, and arranged in substantially horizontal positions on lines diverging slightly from the transverse center of the truck, and means connected with the bolster for distributing weight applied to the bolster equally upon said frames when said frames are either parallel or at divergent angles relative to each other.

9. In a truck, the combination of two axles, a bolster, levers pivoted beyond the axles and extended toward the bolster, means for connecting the inner ends of the levers with the bolster, and means connected between the ends of the levers for distributing weight applied to the bolster to the ends of the axles.

10. In a truck, the combination of two axles, an independent frame for each, means for connecting the frames so that they are capable of swinging to position with the axles at divergent angles, a bolster, levers pivoted to the end portions of the bolster and extended toward the axles, hangers pivoted to the levers and to the bolster, and blocks pivoted to the central portions of the levers, said blocks being supported upon the ends of the axles and being capable of limited up and down movement relative to the frames.

11. In a truck, the combination of two independent frames, an axle in each frame, a bearing box for each axle capable of limited sliding movement relative to the frame, a block supported on each bearing box and slidingly connected with the frame, a lever pivoted to each block and fulcrumed to the frame beyond the block, and extended toward the center of the truck, a bolster comprising an upper and a lower member, springs interposed between the members, and hangers connected to the inner ends of said levers, and to the lower bolster member.

12. In a truck, the combination of two frames, an axle in each frame, means for connecting the frames so that the axles may be moved to divergent angles, levers pivoted to the outer portions of the frames and extended toward the centers of the frames, means for supporting the central portions of the levers upon the axles, a bolster, and hangers pivoted to the inner ends of the levers, and extended downwardly and pivoted to said bolster, said parts being so arranged that weight applied to the bolster will tend to hold all of the hangers at substantially the same angles to thereby tend to hold the axles in parallel positions.

13. A truck comprising two frames, an axle in each capable of limited up and down movement, levers fulcrumed to the outer ends of the frames, and extended toward the centers thereof, means for pivotally supporting the central portions of the levers upon the ends of the axles, a bolster, hangers connected to the inner ends of said levers, and extended downwardly and pivoted to the bolster, said hangers being arranged at such angles that when weight is applied to the bolster, they will tend to move the frames to parallel positions.

14. A truck comprising two frames, an axle in each frame, capable of limited up and down movement, a sliding block resting upon each end of each axle, a connecting piece centrally pivoted to both frames, an upper and a lower bolster member, springs interposed between them, levers fulcrumed to the outer ends of the frame, pivoted to the said sliding blocks and extended to points adjacent to the ends of the bolster, and hangers pivoted to the levers and extended downwardly and pivoted to the lower bolster member.

15. A truck comprising two frames, an axle in each capable of limited up and down movement, levers fulcrumed to the outer ends of the frames, and extended toward the centers thereof, means for pivotally supporting the central portions of the levers upon the ends of the axles, a bolster, hangers connected to the inner ends of said levers, and extended downwardly and pivoted to the bolster, said hangers being arranged at such angles that when weight is applied to the bolster, they will tend to move the frames to parallel positions, and equalizing levers pivoted to the frames and to the bolster for holding the frames either in parallel positions or at divergent angles.

16. A truck, comprising two independent frames, an axle in each frame, a bolster, means for pivotally connecting the frames with each other, levers fulcrumed to the outer portions of the frames and extended inwardly, means for connecting their central portions to the ends of the axles, and means for connecting their ends to the said bolster, whereby when the trucks are turned to position with the axle in divergent angles, the end of the bolster adjacent to the ends of the axles that are farthest separated will be slightly elevated.

17. A truck, comprising two axles, a frame for each axle, a bolster arranged between the axles, said frames being so arranged relative to the bolster that they may turn at divergent angles relative to the bolster, and means for automatically raising the end of the bolster that is adjacent to the ends of the frames that are most widely separated, when said frames are moved to position at angles divergent from the bolster.

18. A truck, comprising two axles, a frame for each axle, a bolster arranged between the axles, levers connected to said frames, and hangers pivoted to the levers and to the bolster, and so arranged that when the frames are moved to divergent angles relative to each other, the end of the bolster that is adjacent to the ends of the frame that are most widely separated will be elevated.

Des Moines, Iowa, Jan. 11, 1908.

ALBERT M. CLARK.

Witnesses:
F. E. NORTHUP,
C. A. SEELY.